Patented May 14, 1946

2,400,393

UNITED STATES PATENT OFFICE 2,400,393

NEW COMPOSITION OF MATTER

Melvin De Groote, University City, Mo., assignor to Petrolite Corporation, Ltd., Wilmington, Del., a corporation of Delaware No Drawing. Application August 16, 1944, Serial No. 549,785

9 Claims. (Cl. 260—399)

This invention relates to a new chemical product or compound and to the manufacture of same, my present application being a division of my co-pending application Serial No. 517,276, filed January 6, 1944.

One object of my invention is to provide a new chemical product or compound that is particularly adapted for use as a demulsifier for crude oil emulsions, but which is also capable of various other uses.

The new composition of matter herein described, consists of an oxyalkylation derivative of a lower alkyl ester of a polymerized higher fatty acid having a polyethylenic linkage, and more especially, those having conjugated double bonds or the oxyalkylation product of a mixture of such esters.

Similarly, the oxyalkylation derivatives of such sulfurized lower alkyl esters are included. The polymerization of such esters, prior to sulfurization, includes isomerization. Sulfurization probably includes, at least in part, the formation of other linkages involving the sulfur atom, and thus is a reaction or group of reactions comparable in nature to polymerization and isomerization, as far as enhanced molecular weight is concerned.

The sulfurized products are most conveniently prepared after the isomerization and polymerization step, although, as pointed out, one may subject the products to oxyethylation without sulfurization. See U. S. Patent No. 2,325,040, dated July 27, 1943, to Cook and Bradley. Much that is said hereinafter in the discussion of these reactants is substantially as it appears in said patent.

One may prepare monoalkyl esters of unsaturated fatty acids having polyethylenic linkages, in the conventional manner. Such products, and particularly the lower monoalkyl esters, may be isomerized and polymerized substantially as described in Industrial & Engineering Chemistry, 32, 802–808 (1940) and 33, 86–89 (1941).

In order to produce the sulfurized product, it is only necessary to resort to the conventional sulfurizing step. Having obtained the isomerized and polymerized esters of polyethylenic unsaturated fatty acid, and particularly those having conjugated double bonds, it is only necessary to heat such products with elemental sulfur to produce the corresponding sulfurized esters. It is again emphasized, however, such products may be subjected to oxyalkylation, without previously being subjected to sulfurization.

I have found that the sulfurized esters of polymerized unsaturated fatty acids, and especially those having conjugated double bonds, and particularly those containing from about 1 to 15% of sulfur, are especially suitable as reactants for subsequent combination with the reactive olefine oxide.

In connection with the utility of these products in demulsification, attention is directed to the copending application for patent of De Groote and Keiser, Serial No. 492,185, filed June 23, 1943.

It is understood that the sulfurized esters may contain more than 15% of sulfur, provided that such products are still sub-rubbery, or, in any event, are susceptible to reaction with a reactive oxyalkylating agent, such as ethylene oxide. Thus, the reactants used prior to oxyalkylation, whether rubbery or not, may be much more highly polymerized than those described in the aforementioned Cook and Bradley patent.

In said Cook and Bradley patent the significant feature required solubility in lubricating oil to the minimum extent of one-half of 1%. Obviously, excessive polymerization or excessive sulfurization, or both, might result in a product which would be insoluble in lubricating oil, and so be of little or no value for the purpose set forth in said above mentioned Cook and Bradley patent. No such limitation exists in the present instance, and polymerization, or sulfurization, or both, may be carried to any suitable degree, so long as the product, prior to oxyethylation, or after oxyethylation, is sub-rubbery in nature; that is, susceptible to convenient use in the manner hereinafter indicated. As subsequently pointed out, in some instances solubility of the composition equivalent to one part in 50,000 parts of emulsion, may be perfectfully serviceable. For this reason, solubility restrictions of the kind previously noted in connection with improved lubricating oil compositions, as contemplated by the above mentioned Cook and Bradley patent, do not obtain in the present instance.

Oxyalkylation, and particularly oxyethylation, is apt to involve any labile hydrogen atom, as, for example, a hydrogen atom attached to an oxygen atom. Other reactions involving ethylene oxide or the like are those in which ester rearrangement or interchange takes place. In other instances, aldehydric or ketonic carbonyl radicals may be effected. In a general way, oxyalkylation, and particularly oxyethylation, takes place at moderate temperatures, for instance, 150–200° C., under moderate pressures, for instance, not over 450 lbs. gauge pressure. Such reactions may be accelerated by means of a catalyst, such as a small amount of alkali, as, for instance, one-fourth percent of sodium methylate. Such reactions are conducted with constant stirring, so as to promote contact with the ethylene oxide or other oxyalkylating agent. Generally speaking, the reaction or series of reactions are conducted in a step-wise manner, i. e., if one intended to introduce 4–20 moles of ethylene oxide per mole of monohydric alcohol ester, one might introduce 2 moles of ethylene oxide at a time until approximately one-half the ethylene oxide had been introduced, and thereafter, the proportion may be increased until the total amount is introduced. The completeness of reaction is generally indicated by the disappearance of pressure, due to the absence of unreacted ethylene oxide, or the like. Since such procedure, i. e., the oxyalkylation of fatty acid esters is well known, elaborate description will be avoided, for the simple reason that the oxyalkylation of herein contemplated compounds takes place by the same procedure, except that the conditions for oxyalkylation are somewhat more vigorous, i. e., it is more difficult to initiate and continue the reactions. More details as to the conditions of the reaction will be found subsequently in regard to individual examples. Caution is required when glycide, or methyl glycide, is employed.

Preparation of Unsaturated Esters

The methyl esters of soyabean fatty acids, or dehydrated castor oil fatty acid, linseed oil fatty acid, tung oil fatty acid, or other suitable acids, are prepared in the manner described in Industrial & Engineering Chemistry, 32, 802–808 (1940). Ethyl esters are prepared in a similar manner. The propyl, butyl, amyl and hexyl esters may also be utilized. The heptyl or octyl esters may also be employed.

Dimerization of Low Molal Esters

The low molal esters of the kind previously described are isomerized and polymerized by heat treatment of 250 to 300° C. It is believed that the major portion of the product obtained is a dimer. The procedure followed is essentially that described in preparing the dimerized methyl esters and ethyl esters in the aforementioned technical reference. It was pointed out in said reference that 5 to 25 hours is usually sufficient for polymerization, although in some instances, a period of time as long as 50 hours may be employed. Such polymerization or isomerization may be continued further by employing a longer period of time, for instance, up to 100 hours, or by adding a mere trace of a suitable catalyst of the kind that accelerates this particular type of reaction, such as sulfuric acid, organic sulfonic acid, zinc chloride, aluminum chloride, various boron compounds, such as boron fluoride, peroxides, etc. The amount of catalyst employed may vary from five-hundredths of 1% to ½%. There is no need to employ fractionation to separate any unreacted monomer; it may remain in the reaction mass.

Sulfurization Procedure

Sulfurization procedure involves the addition of 1 to 15% or more of the elemental sulfur, or its equivalent, to the polymerized esters. The temperature employed in sulfurization is approximately 150–175° C. The time of sulfurization may vary from 1 hour to 5 hours.

Oxyalkylation Procedure

Oxyalkylation is conducted in the conventional manner. Oxyethylation of high molal compounds is well known. For instance, acids, alcohols, amides, mercaptans, and the like, are readily susceptible to oxyethylation. The reaction involves a labile hydrogen atom. For example, a hydrogen atom attached to a nitrogen atom, an oxygen atom, or a sulfur atom. Oxyalkylation may involve other reactions. For instance, it is known that total esters will react readily with the ethylene oxide, and this is also true of certain carboxyl compounds not containing a labile hydrogen atom. Under more drastic conditions a carbon-linked hydrogen atom may enter into reaction. The reaction can generally be hastened by the addition of a small amount of an alkaline catalyst, such as caustic soda, sodium acetate, sodium carbonate, sodium bicarbonate, or sodium methylate. Such reactions generally take place readily and do not require excessive pressure. The steps employed in the present instance are substantially the same as those described in U. S. Patent No. 2,208,581, dated July 23, 1940, to Hoeffelmann. The time of reaction varies with the amount of alkylene oxide absorbed. The most suitable oxyalkylating agents are ethylene oxide, propylene oxide, butylene oxide, glycidol, etc. However, there are other well known oxyalkylating agents. For instance, U. S. Patent No. 2,208,581, dated July 23, 1940, to Hoeffelmann, enumerates the following: Glycerine epichlorhydrin, glycide alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc.

Oxyalkylated Non-Sulfurized Derivative

Example 1

The methyl esters of dehydrated castor oil fatty acids are isomerized and polymerized by heat treatment at 250–300° C. The major portion of the product obtained consists of the methyl ester of dimerized conjugated linoleic (octadecadienoic) acid. 175 lbs. of a polymerized material is mixed with 1 pound of sodium stearate, and then subjected to reaction in a suitable autoclave with 46 lbs. of ethylene oxide. The temperature employed is approximately 170° C., and the time approximately 15 hours. During this period the gauge pressure drops from a maximum of 320 lbs. to 0 lbs. per square inch. The mass is agitated continuously during reaction period. The product so obtained is a dark amber, oily compound having somewhat marked hydrophile properties, i. e., a tendency towards self-emulsification.

Oxyalkylated Non-Sulfurized Derivative

Example 2

The same procedure is followed as in the preceding example, except that after the initial drop to zero, a second batch, to wit, 46 lbs. more of ethylene oxide, were added, and reaction conducted for 10 hours, until there was a drop from 300 lbs. gauge pressure to zero. The product so obtained is a self-emulsifying oil and represents an approximate molar ratio of 1 to 4.

Oxyalkylated Non-Sulfurized Derivative

Example 3

135 lbs. of material obtained in the manner described in Example 2, preceding, is treated with 46 lbs. of ethylene oxide at a temperature of 170° C. for 8 hours. During this reaction period the pressure reached a maximum of 420 lbs. and dropped to zero. This represents an approximate ratio of 1 to 8. The product so obtained shows solubility in water, with some persistent cloudiness, although markedly more soluble than the preceding example.

Oxyalkylated Non-Sulfurized Derivative

Example 4

A batch of material, as described in the preceding example, was prepared and treated with an additional 136 lbs. of ethylene oxide. Substantially the same temperature, time and pressure conditions were employed as in the preceding example. This product represented an approximate molar ratio of 1 to 16. It was readily soluble in water to give a clear solution, without any disturbance or turbidity. The product is distinctively more water-soluble than the preceding example.

Oxyalkylated Non-Sulfurized Derivative

Example 5

The same procedure is followed as in Examples 1 to 4, except that 145 lbs. of the corresponding ethyl esters are employed.

Oxyalkylated Non-Sulfurized Derivative

Example 6

The same procedure is followed as in Examples 1 to 5, inclusive, except that the methyl or ethyl esters derived from soyabean oil fatty acids are substituted in equal molar amount for those derived from dehydrated castor oil fatty esters.

Oxyalkylated Non-Sulfurized Derivative

Example 7

The same procedure is followed as in Examples 1 to 5, inclusive, except that the methyl or ethyl esters derived from linseed oil fatty acids are substituted in equal molar amount for those derived from dehydrated castor oil fatty esters.

Oxyalkylated Non-Sulfurized Derivative

Example 8

The same procedure is followed as in Examples 1 to 5, inclusive, except that the methyl or ethyl esters derived from tung oil fatty acids are substituted in equal molar amount for those derived from dehydrated castor oil fatty esters.

Oxyalkylated Non-Sulfurized Derivative

Example 9

The same procedure is followed as in Examples 1 to 8, inclusive, except that a molecular equivalent of propylene oxide, butylene oxide, glycide or methyl glycide, is substituted for ethylene oxide. Methyl glycide and glycide may react with almost explosive violence. These two reactants should be added in extremely small step-wise proportions and a somewhat lower temperature employed. Propylene oxide and butylene oxide react less readily than ethylene oxide, and may require a somewhat higher temperature, for instance, 25 to 50° C. higher, and somewhat higher gauge pressure, for instance, a maximum of 400–450 lbs., and a somewhat longer time of reaction, for instance, a maximum of 25 to 40 hours.

Oxyalkylated Sulfurized Derivative

Example 1

The methyl esters of dehydrated castor oil fatty acids are isomerized and polymerized by heat treatment at 250–300° C. The major portion of the product obtained consists of the methyl ester of dimerized conjugated linoleic (octadecadienoic) acid. This product is heated with 10% of sulfur by weight, for 1½–3 hours at a temperature of 155–165° C. A viscous brown liquid is obtained, which is then subjected to treatment with ethylene oxide. 150 lbs. of such viscous brown liquid is mixed with 1 lb. of sodium stearate and then subjected to reaction in a suitable autoclave with 46 lbs. of ethylene oxide. The temperature employed is approximately 170° C., and the time approximately 15 hours. During this period the gauge pressure drop was from a maximum of 320 lbs. to 0 lbs. per square inch. The mass was agitated continuously during reaction period. The product so obtained is a dark amber, oily compound having somewhat marked hydrophile properties, i. e., a tendency towards self-emulsification.

Oxyalkylated Sulfurized Derivative

Example 2

The same procedure is followed as in the preceding example, except that after the initial drop to zero, a second batch, to wit, 46 lbs. more of ethylene oxide, were added, and reaction conducted for 10 hours, until there was a drop from 300 lbs. gauge pressure to zero. The product so obtained is a self-emulsifying oil and represents an approximate molar ratio of 1 to 4.

Oxyalkylated Sulfurized Derivative

Example 3

150 lbs. of material obtained in the manner described in Example 2, preceding, is treated with 46 lbs. of ethylene oxide at a temperature of 170° C. for 8 hours. During this reaction period the pressure reached a maximum of 400 lbs. and dropped to zero. This represents an approximate ratio of 1 to 8. The product so obtained shows solubility in water, with some persistent cloudiness, although markedly more soluble than the preceding example.

Oxyalkylated Sulfurized Derivative

Example 4

A batch of material, as described in the preceding example, was prepared and treated with an additional 136 lbs. of ethylene oxide. Substantially the same temperature, time and pressure conditions were employed as in the preceding example. This product represented an approximate molar ratio of 1 to 16. It was readily soluble in water to give a clear solution without any disturbance or turbidity. The product is distinctly more water soluble than the preceding example.

Oxyalkylated Sulfurized Derivative

Example 5

The same procedure is followed as in Example 4, except that 155 lbs. of the corresponding ethyl esters are employed.

Oxyalkylated Sulfurized Derivative

Example 6

The same procedure is followed as in Examples 1 to 5, inclusive, except that the methyl or ethyl esters derived from soyabean oil fatty acids are substituted in equal molar amount for those derived from dehydrated castor oil fatty esters.

Oxyalkylated Sulfurized Derivative

Example 7

The same procedure is followed as in Examples 1 to 5, inclusive, except that the methyl or ethyl esters derived from linseed oil fatty acids, are substituted in equal molar amount for those derived from dehydrated castor oil fatty esters.

Oxyalkylated Sulfurized Derivative

Example 8

The same procedure is followed as in Examples 1 to 5, inclusive, except that the methyl or ethyl esters derived from tung oil fatty acids are substituted in equal molar amount for those derived from dehydrated castor oil fatty esters.

Oxyalkylated Sulfurized Derivative

Example 9

The same procedure is followed as in Examples 1 to 8, inclusive, except that a molecular equivalent of propylene oxide, butylene oxide, glycide or methyl glycide, is substituted for ethylene oxide. Methyl glycide and glycide may react with almost explosive violence. These two reactants should be added in extremely small step-wise proportions and a somewhat lower temperature employed. Propylene oxide and butylene oxide react less readily than ethylene oxide, and may require a somewhat higher temperature, for instance, 25 to 50° C. higher, and somewhat higher gauge pressure, for instance, a maximum of 400–450 lbs. and a somewhat longer time of reaction, for instance, a maximum of 25 to 40 hours.

Oxyalkylated Sulfurized Derivative

Example 10

The same procedure is followed as in Examples 1 to 9, preceding, except that 15% of sulfur by weight is employed instead of 10% by weight, and the period of sulfurization varied from approximately 2 hours to 4½ hours.

All the preceding examples are obtained from the non-fractionated polymerized esters. It has been previously pointed out that such non-fractionated products may contain a substantial amount of the monomeric esters, for instance, about 25% to 35%. There is no objection to such monomer being present in the reaction. If desired, however, the monomeric material can be removed by fractional distillation in the manner set forth in the technical references previously mentioned. Such reactant substantially free from the monomers can be substituted in all the various examples preceding.

Materials of the kind herein contemplated are useful as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials herein described, when employed as demulsifiers for water-in-oil emulsions, may be mixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000 in desalting practice, such an apparent insolubility in oil and water is not significant, because said reagents undoubtedly have solubility within the concentration employed. This same fact is true in regard to the material or materials herein described.

I desire to point out that the superiority of the herein described new material, when employed as a demulsifier, is based upon its ability to treat certain emulsions more advantageously and at a somewhat lower cost than is possible with other available demusifiers, or conventional mixtures thereof. It is believed that the particular demulsifying agent or treating agent herein described will find comparatively limited application, as far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

I have found that the particular chemical compounds or reagents herein described may also be used for other purposes, for instance, as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants, or wetting agents, in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

I have found that the most valuable products, by far, are obtained by use of the oxyalkylating agent, for instance, ethylene oxide, within the ratio of 10 moles of ethylene oxide per mole of higher fatty acid originally employed as the raw material.

As to other suitable fatty acids which can be converted into low molal esters and employed, see those specifically mentioned in the previous two literature references, and also in the aforementioned Cook and Bradley patent. Particularly, see oiticica oil.

Having thus described my invention, what I claim as new and desire to secure by Letters Patent is:

1. A new composition of matter, consisting of a member of the class consisting of oxyalkylated lower alkyl esters of a polymerized polyethylenic higher fatty acid and oxyalkylated sulfurized lower alkyl esters of a polymerized polyethylenic higher fatty acid; the alkyl radical of said lower alkyl esters containing not over 8 carbon atoms.

2. The composition of matter described in claim 1, wherein the polyethylenic higher fatty esters have conjugated double bonds.

3. The composition of matter described in claim 1, wherein the polyethylenic higher fatty esters have conjugated double bonds, and the number of carbon atoms in the oxyalkyl group are at least 2 and not over 4.

4. The composition of matter described in claim 1, wherein the polyethylenic higher fatty esters have conjugated double bonds, the number of carbon atoms in the oxyalkyl group are at least 2 and not over 4, and the number of carbon atoms in the alkyl esters are not over 6.

5. The composition of matter described in claim 1, wherein the polyethylenic higher fatty esters have conjugated double bonds, the number of carbon atoms in the oxyalkyl group are at least 2 and not over 4, and the number of carbon atoms in the alkyl ester are not over 2.

6. The composition of matter described in claim 1, wherein the polyethylenic higher fatty acid esters have conjugated double bonds, the oxyalkyl group is an oxyethyl group, and the number of carbon atoms in the alkyl ester are not over 2.

7. The composition of matter described in claim 1, wherein the higher fatty acid ester is a dehydrated castor oil fatty acid ester, the oxyalkyl group is an oxyethyl group, and the number of carbon atoms in the alkyl ester are not over 2.

8. The composition of matter described in claim 1, wherein the higher fatty acid ester is an oiticica oil fatty acid ester, the oxyalkyl group is an oxyethyl group, and the number of carbon atoms in the alkyl ester are not over 2.

9. The composition of matter described in claim 1, wherein the higher fatty acid ester is a tung oil fatty acid ester, the oxyalkyl group is an oxyethyl group, and the number of carbon atoms in the alkyl ester are not over 2.

MELVIN DE GROOTE.